United States Patent

[11] 3,587,889

| [72] | Inventors | Karl Gunnar Bohlin;<br>Carl-Erik Gustafsson; Per Albin Strombeck, Sundsvall; Stig Arthur Johnsson, Tuna Dalsuerken, Sweden |
|---|---|---|
| [21] | Appl. No. | 751,643 |
| [22] | Filed | June 11, 1968 |
| [45] | Patented | June 28, 1971 |
| [73] | Assignee | Svenska Cellulosa Aktiebolaget<br>Sundsvall, Sweden<br>Division of Ser. No. 548,113, May 6, 1966, Pat. No. 3,413,027. |

[54] METHOD AND APPARATUS FOR HANDLING A LOAD
2 Claims, 12 Drawing Figs.

[52] U.S. Cl. .................................................. 214/152, 294/67
[51] Int. Cl. ..................................................... B66c 1/18

[50] Field of Search.... ........................... 224/55-—58, 49, 47, 294/67.4 (A), 67.4, 81, 67, 67.5, 67.4 (BC); 214/152; 100/(Inquired); 53/134, 14

[56] References Cited

UNITED STATES PATENTS

| 946,850 | 1/1910 | Tabler......................... | 224/55 |
| 1,611,455 | 12/1926 | Keeler......................... | 224/55 |
| 313,021 | 2/1885 | 224 .............................. | 47/47 |

FOREIGN PATENTS

| 1,088,202 | 9/1960 | Germany...................... | 224/55 |

*Primary Examiner*—Gerald M. Forlenza
*Assistant Examiner*—Frank E. Werner
*Attorney*—Stevens, Davis, Miller and Mosher ABSTRACT: A method for handling loads comprising the steps of substantially enclosing the load with a bandlike packaging material having at least one vertically directed loop, connecting force-transmitting elements to opposite sides of the load adjacent the upper surface thereof, and applying lifting forces to these elements.

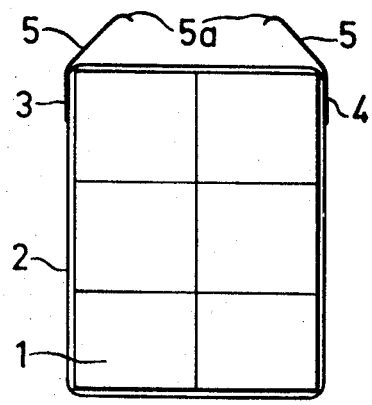
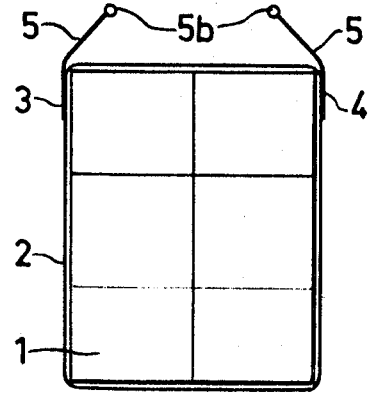
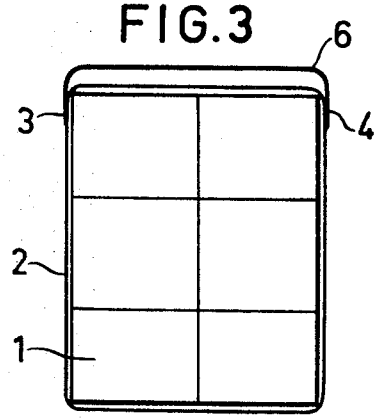
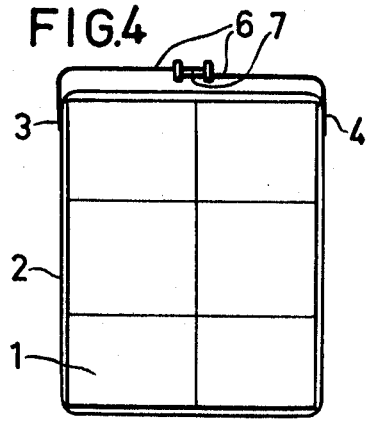
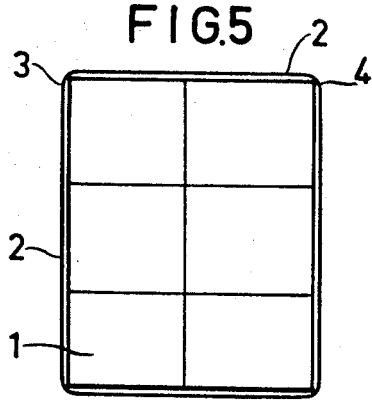
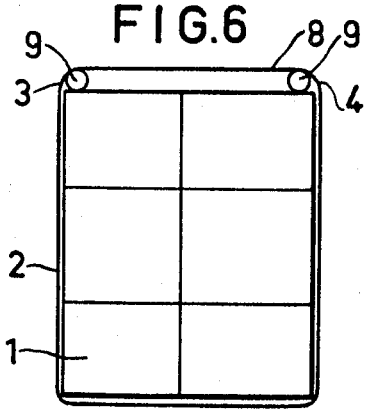

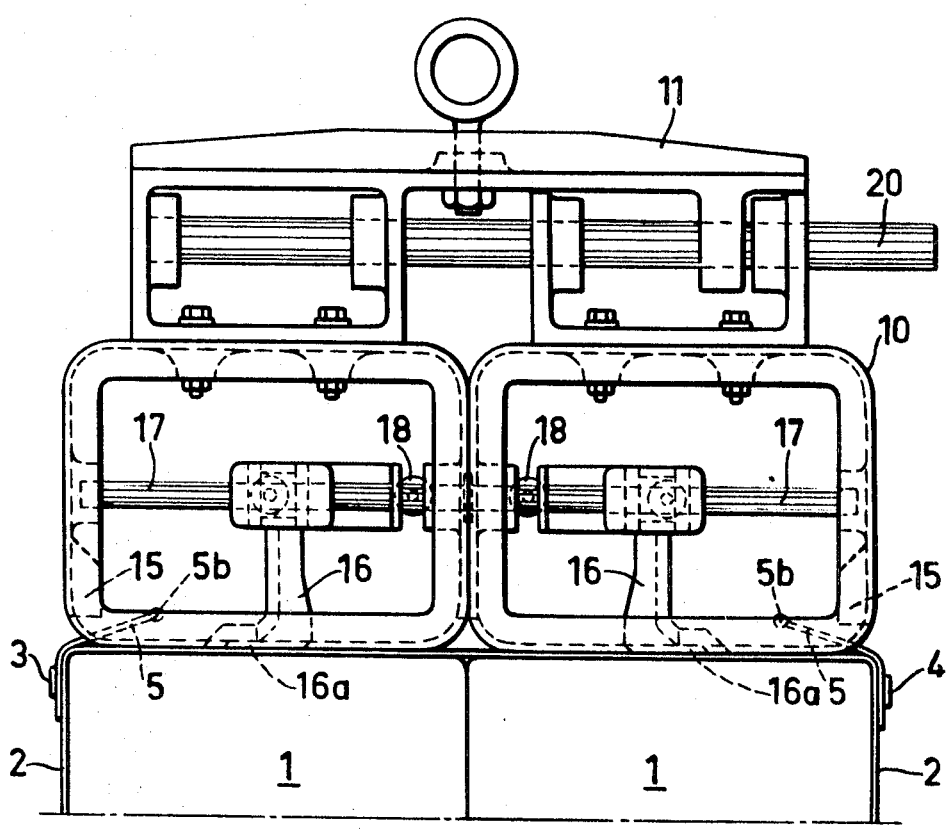

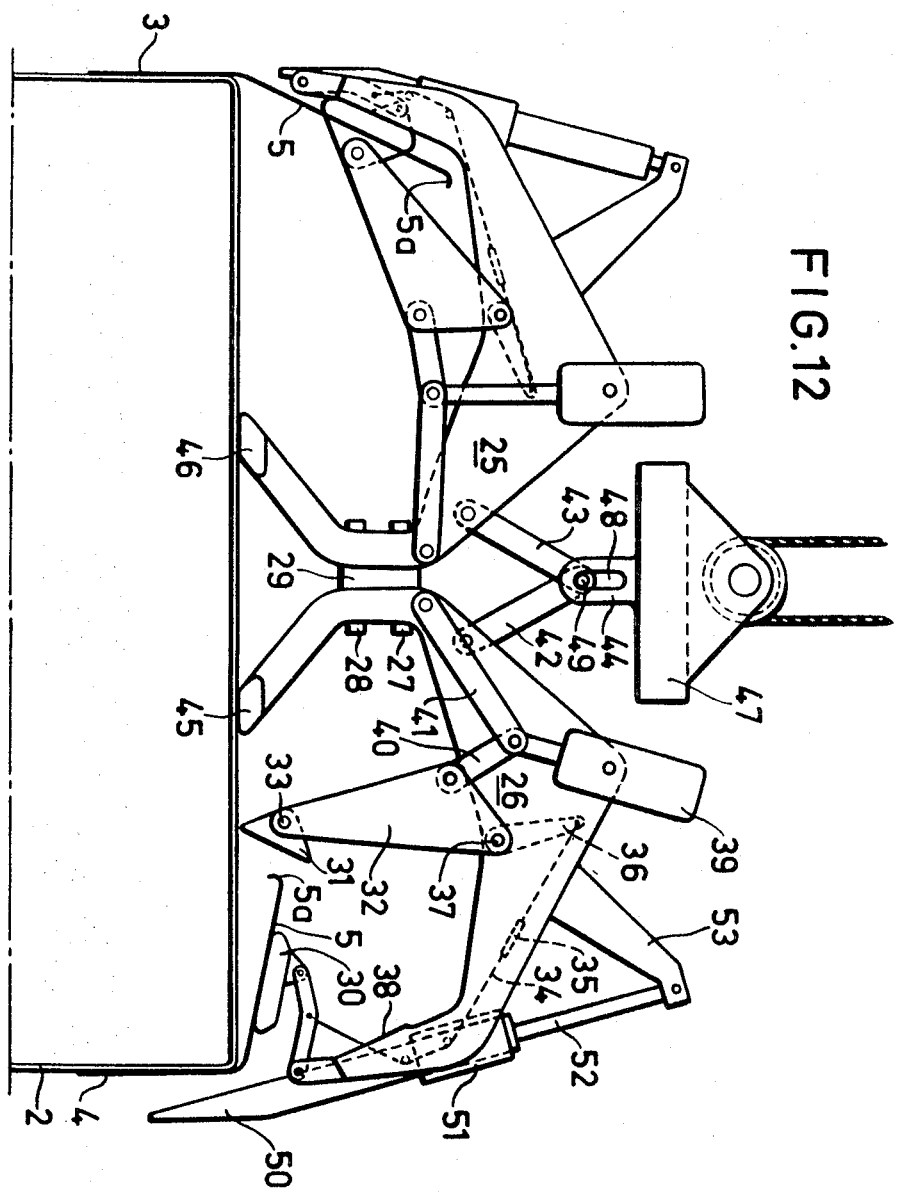

METHOD AND APPARATUS FOR HANDLING A LOAD

The present application is a division of application Ser. No. 548,113 filed May 6, 1966, now U.S. Pat. No. 3,413,027.

This invention relates to a method and apparatus for handling a load, and more particularly, to a method and apparatus for handling a load enclosed by a packaging material which is in the form of one or more loops or the like arranged preferably in a vertical plane with respect to the load. The invention is adapted, for example, for the handling of loads consisting of cellulose bales, saws wood, and the like, but its applicability is in no way restricted to these materials.

The method and apparatus according to the present invention is characterized in that the forces required for the handling operation are applied to the packaging material at least two points of the material which are situated on opposite sides of the load, and preferably close to the upper surface thereof.

According to one embodiment, the forces can be applied in such a manner that the gripping members of a lifting apparatus are caused to grip about or clamp the packaging material at the above-mentioned points, whereafter the load can be lifted by means of the packaging material.

In another embodiment the forces required for the handling operation are applied via special force-transferring lifting elements which are preferably in permanent connection with the packaging material at the said points. These elements may be in the form of straps adapted to be caught by a lifting apparatus utilized for handling the load. The gripping members of the lifting apparatus may be of such a type that they retain the elements by a clamping, locking or similar effect, and they may be adjustable to various dimensions of the loads to be handled.

In certain cases it may be desirable to provide the lifting apparatus with special means which, for example, by sucking or magnetic action, initially catch the elements before they are gripped by the gripping members of the lifting apparatus.

The invention is described in the following in greater detail, reference being made to the accompanying drawings wherein:

FIGS. 1—6 are plan views of six different embodiments of a packaging material with or without the force-transferring elements, the packaging material enclosing a load comprising six units of cellulose bales, for example;

FIG. 9 is a partial end view of the arrangement of FIGS. 7 and 8, the lifting device being shown in a position in which the load is not yet gripped;

FIG. 12 is a plan view of an alternative embodiment of a lifting apparatus according to the present invention.

Figure 7:
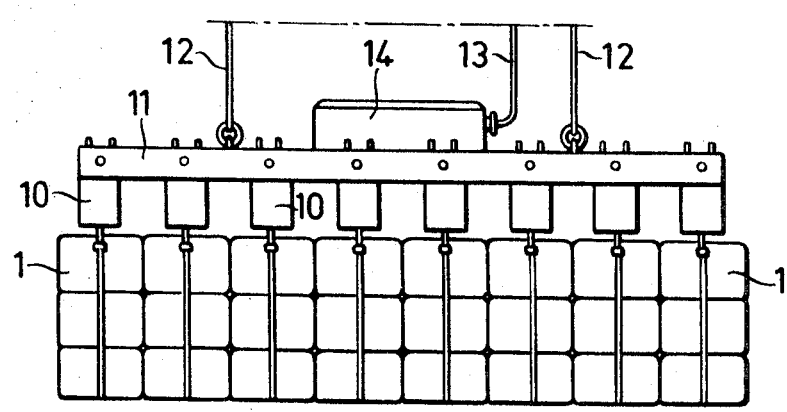
FIG. 7 is a side view depicting a lifting apparatus assembled for handling a unit load comprising eight partial loads according to FIGS. 1—6, and dimensioned such that optimum handling economy in the loading and unloading of the goods in question is obtained.

Referring specifically to FIGS. 1—6 of the drawings, a load is shown which consists of, for example, a plurality of cellulose bales 1, which are packaged by a packaging material 2 which may be, for example, in the form of a steel band, a nylon rope, or the like. The packaging material encloses the load and forms a substantially vertical loop. There may be one or several of such loops placed around the load. At the opposite ends 3, 4 of the load and close to its upper part, separate force-transferring elements 5 are mounted which, for example, may be steel bands. These bands are secured on the packaging material by spot welding or the like, and are intended to serve as lifting straps for the handling of the load. The free ends of these lifting straps may be provided with bent portions 5a as shown in FIG. 1, or stop members 5b as shown in FIG. 2. The stop members of FIG. 2 may be in the form of balls, rods or the like, in order to ensure a locking effect when the straps are caught by a lifting apparatus in the manner described below.

FIGS. 3 and 4 show a force-transferring element 6 which is secured at each end to the packaging material 2 at opposite points 3 and 4. In FIG. 4 the element 6 is made of two parts which, at their ends, are provided with sliding pieces 7 for moving the element parts 6 together and thereby effecting better protection of the load when several loads are stacked one upon the other.

For handling a load which is packaged by a simple strip 2 according to FIG. 3, the lifting force is applied in opposite points 3 and 4 on the packaging material by means of separate gripping members of a lifting apparatus. These gripping members may be arranged to penetrate while gripping into the load and be moved under the packaging material 2.

According to the embodiment of FIG. 6, separate spacer members 9 may be provided under the packaging material in order to avoid damage of the load in connection with the gripping of the packaging material. As shown in FIG. 6, the spacer members may be tube pieces which are gripped directly by the gripping members.

Figure 8:
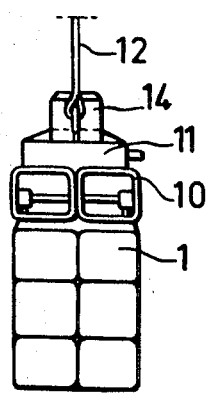
FIG. 8 is a front view of the arrangement according to FIG. 7.

FIGS. 7 and 8 show an assembled lifting apparatus 11 for cellulose bales according to the invention. The lifting apparatus 11 comprises eight identical lifting devices 10, each of which is adapted to lift a load according to any of FIGS. 1—6. Therefore, a unit load is obtained which includes eight partial loads, each of which comprises six cellulose bales, it being understood that these numbers may be varied within the scope of this invention.

The assembled lifting apparatus 11 is carried by cables 12 from a loading crane or the like. Also, a control unit 14 may be provided which has a line or cable 13 for energy transfer, this unit being adapted to effect the movements of the gripping members in the lifting device 10.

Figure 11:
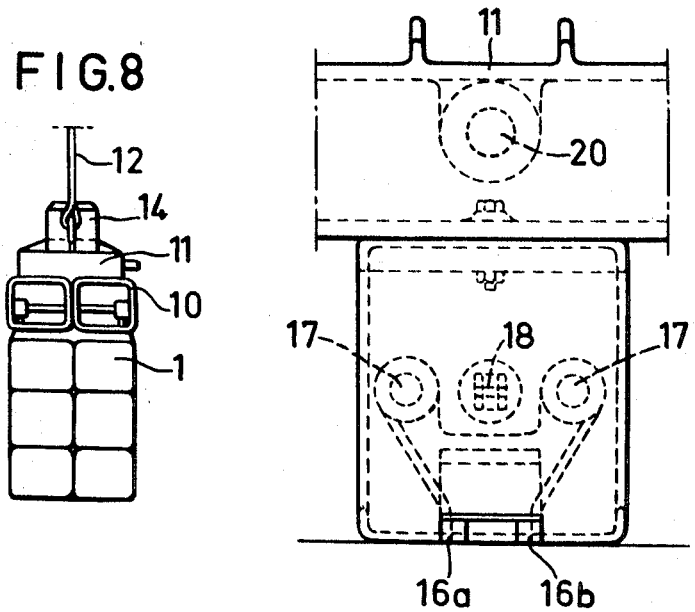
FIG. 11 is a partial end view of the device according to FIGS. 9 and 10.
Figure 10:
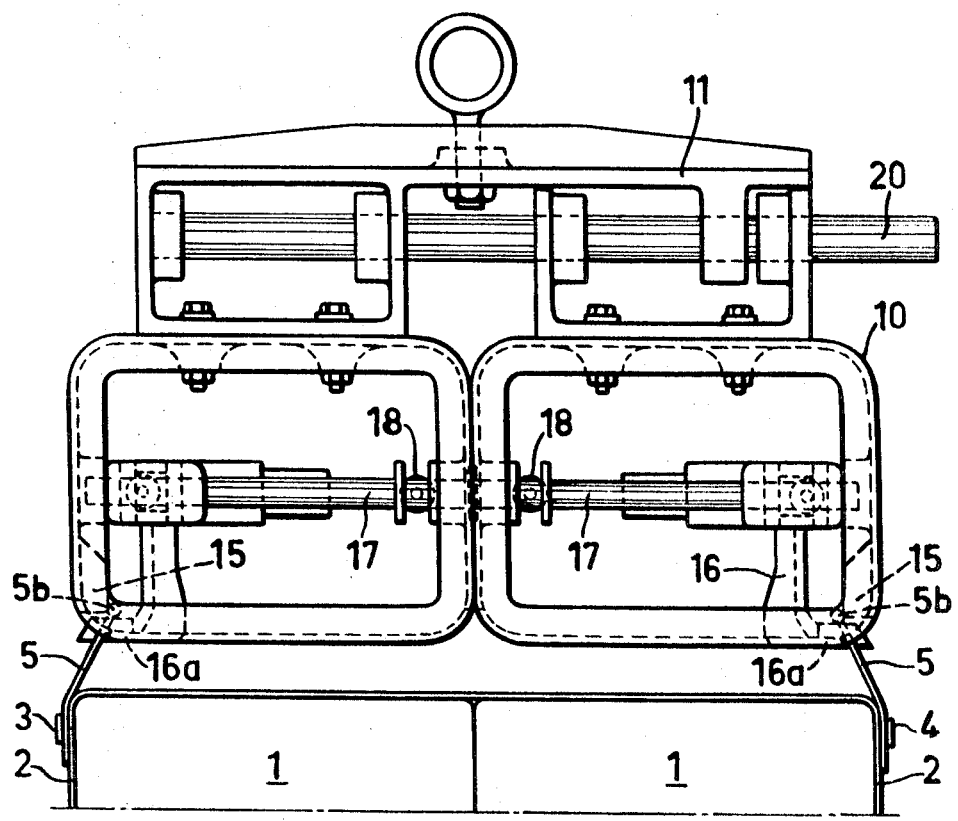
FIG. 10 is a view similar to FIG. 9, but showing the lifting device in a position in which the load has been gripped.

FIGS. 9—11 show on an enlarged scale, but only in a schematic manner, a lifting device 10. In FIG. 9, the lifting device is shown in a starting position prior to the gripping of the load. The lifting device 10 comprises two, preferably identical, grippers, each of which is adapted to grip and hold one of the lifting straps 5. These grippers comprise a fixed stop 15 and a movable grip claw 16 having two identical grip fingers 16a and 16b, as shown in FIG. 11. The grip claw 16 is displaceable along two guides 17 and is actuated by a drive engine 18 of any known type. The distance between the lifting devices 10 can be adjusted according to different load dimensions by moving at least one of them along a guide 20 on the assembled lifting apparatus 11.

The lifting devices operate as follows. When a load consisting, for example, of cellulose bales 1 and enclosed by the packaging material 2, is to be gripped, the lifting device 10 is lowered until it comes to rest on the upper surface of the load. At this moment the grip claws are moved inwards to the center of the lifting device. The distance between the two fingers 16a and 16b of the grip claws 16, at least at the top of the fingers, is such that the lifting straps 5 are caught safely between the lift fingers when the lifting device 10 is placed centrally on the load, and when the grip claws 16 are subsequently moved from the starting position in the direction towards the fixed stops 15. After this latter movement, the lift straps are retained between the grip claws 16 and the fixed stops 15, as shown in FIG. 10. In this position, the separate locking means 15b, which may be in the form of rods, beads or the like, safely prevent the straps 5 from sliding out of the grip of the lifting device.

The lifting of the load can now be initiated. As shown in the drawings, the lifting force is applied at the substantially vertical parts of the packaging material by which the load is enclosed. The packaging material, thereby, is exposed only to forces which are equal with the weight of the load, and thus, requires only a dimensioning strong enough to withstand the stresses caused thereby.

FIG. 12 shows a lifting device according to another embodiment of the invention. This embodiment is based on the principle of gripping and holding, by clamping action, the force-transferring elements secured on the packaging material of the load. The lifting device comprises two frame halves 25 and 26 secured to each other by bolts 27 and 28, and a spacing member 29 inserted between the frame halves. By using spacing members of different sizes, correction can be made for different load widths.

The right-hand portion of FIG. 13 shows the gripping members of the lifting device in a position prior to the clamping of the lifting straps 5. The clamping is effected between two clamp plates 30 and 31, at least a portion of plate 30 being of a magnetic material which, in the position shown, has attracted the lifting strap 5, at least a portion of which is provided with a piece of a ferromagnetic material. The clamp plate 31 is mounted on an arm 32 by a joint 33 of limited movability in the direction towards the clamp plate 30. When the clamp plate 30 is being pulled upwards, the clamp plate 31 moves towards the same and finally assumes a position which is shown in the left-hand portion of FIG. 12. In this portion, the lifting strap 5 lies clamped between the clamp plates 30 and 31. Due to the movement of the clamp plate 31 shown in FIG. 12, the lifting strap 5 is caught even if the magnet in the clamp plate 30 is not capable of retaining the lifting strap for its entire length as the plate moves to its final position.

The transfer of the movement between the clamp plate 30 and the clamp plate 31 can be synchronized, for example by a hydraulic or mechanical arrangement. As shown in the drawing, the synchronization is effected by use of a cable 34 which is mounted on the arm 36, the latter being connected with the clamping arm 32 by the pivot 37. A spring 35 permits for the stretching of the cable 34 in the final position.

In the final position as shown to the left of FIG. 12, the lifting strap 5 is clamped between the clamp plates 30 and 31 with such a strong force that the friction between the lifting strap and the clamp plates is sufficient for lifting the load. The force acting upon the clamp plate 30 is taken up substantially by the stop 38 on the frame half 26. The clamping arm 32 is operated by the pressure medium cylinder 39 via the links 40 and 41. These links are designed so that a strong clamping force is obtained between the clamp plates 30 and 31 at a relatively low actuating power from the cylinder 39, and so that a relatively quick movement of the clamping arm 32 is obtained during the first phase of its gripping movement.

The frame halves 25 and 26 are carried by the yoke 47 via a lifting eye 44 and links 42 and 43. The lower portion of the frame halves are provided, in their central portions, with feet 45 and 46 for resting on the upper surface of the load.

When the same lifting yoke 47 is provided with several frames, the oval slot 48 in the lifting eye 44 renders it possible to take up loads of different height in the different frames. Also, if the frame was connected rigidly with lifting eye 44, and the load gripped in such a manner that the lifting straps between the clamp plates and the load proper were of different length, the load would be given a nonuniform distribution on the lifting straps. For preventing such nonuniform distribution, the frame is articulated about the pivot 49.

In order to further counteract the risk of nonuniform distribution of the load, each side of the lifting device may be provided with an orienting member 50, each of which slides in a guide 51 and which can be moved upwards and downwards by the operator of the lifting device in order to orient the load. The orienting member 50 can, for example, be operated by a cylinder having its piston rod 52 secured in the bracket 53 which is associated with the frame half. During the loading and unloading operation usually one edge of the load is free. The orienting means 50 situated on this side of the load is lowered first, and thereafter the catching and clamping of lifting straps can be carried out in the manner described above.

The power producing unit required for the equipment is preferably a hydraulic unit in the form of an engine, pump, tank, valve, etc., and may be mounted on the lifting yoke 47.

It should be pointed out that the clamp plates 30 and 31 extend a considerable distance in a direction perpendicular to the plane of the paper in FIG. 12, which distance amounts, for example, to between five and 20 times the width of the lifting straps 5. This increased dimension is provided in order to ensure the clamping of the straps even if, for some reason or another, they are displaced laterally, or if they are inclined in relation to a calculated normal position.

The handling method according to the present invention has the additional advantage that the lifting devices can be manufactured in a simple and cheap manner, particularly when compared with conventional lifting devices which are based on the principle of retaining the load by clamping it from two opposite sides.

The packaging of the load by means of a packaging material in the form of a band or cable does not involve increased expenditures, and this applies also to the mounting of the lifting straps on the packaging material. It should be mentioned that, in cases when the load is enclosed by, for example, two parallel packaging bands, the lifting elements may consist of strips which at their ends are secured at each of the said packaging bands and preferably project above the upper surface of the load, so that they are easily accessible for the gripping members of the lifting device.

The packaging material need not necessarily be made of a steel band for throw-away use, but as an alternative, it may be made of a chain, a rope of strong plastic material, or the like. In the latter case, separate locking means can be provided for connecting the ends of the chain or rope at the packaging in such a manner that the connection can be detached and the chain or rope be utilized several times. Also, the lifting elements may be made of chains or the like of the aforementioned material, in which case the lifting device can be equipped with suction nozzles or the like for catching the lifting elements and facilitating their gripping.

Of course, variations of the specific construction and arrangement of this type mechanism herein disclosed can be made by those skilled in the art without departing from the invention as defined in the appended claims.

We claim:

1. A method for handling a load comprising the steps of applying an elongated and flexible steel band packaging material closely around said load, said packaging material being arranged substantially in a vertical plane; connecting at least one elongated, flexible steel band lifting element to said packaging material at opposite sides of the load and near the top thereof to extend above the load from one side of the load in a direction towards the other side thereof; raising said lifting element above the top surface of the load by positioning a magnetic device above said element whereby the magnetic force of said magnetic device raises said element allowing positioning of the gripping means; bringing a load lifting device provided with gripping means into gripping engagement with the lifting element at a short distance above the top surface of the load and near the opposite sides thereof in a raised position of said lifting element and transferring load lifting forces to the lifting element by means of said gripping means.

2. A method according to claim 1, wherein two gripping means are brought into engagement one under each lifting steel band near the center of the load; and further comprising the step of displacing the gripping means, which are movably arranged on a rigid guiding beam in the lifting device, away from each other to positions near the sides of the load and thereafter lifting the load by means of said lifting device.